US012608465B2

(12) United States Patent
Bravo

(10) Patent No.: US 12,608,465 B2
(45) Date of Patent: Apr. 21, 2026

(54) BOT DETECTION SYSTEM

(71) Applicant: Kyndryl, Inc., New York, NY (US)

(72) Inventor: Cesar Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 388 days.

(21) Appl. No.: 18/298,921

(22) Filed: Apr. 11, 2023

(65) Prior Publication Data

US 2024/0346133 A1 Oct. 17, 2024

(51) Int. Cl.
*G06F 21/55* (2013.01)
*G06T 19/00* (2011.01)

(52) U.S. Cl.
CPC .......... *G06F 21/552* (2013.01); *G06T 19/006* (2013.01); *G06F 2221/2133* (2013.01)

(58) Field of Classification Search
CPC ...................... G06F 21/552; G06F 2221/2133
See application file for complete search history.

(56) References Cited

U.S. PATENT DOCUMENTS

| | | | |
|---|---|---|---|
| 8,543,930 B2 | 9/2013 | Champion et al. | |
| 11,386,349 B1 * | 7/2022 | Prisadnikov ........... | G06N 20/00 |
| 11,533,619 B1 | 12/2022 | Kahn | |
| 2010/0037147 A1 * | 2/2010 | Champion ............ | G06F 21/316 |
| | | | 715/751 |
| 2010/0153722 A1 * | 6/2010 | Bauchot ................ | H04L 9/3263 |
| | | | 713/168 |

| | | | |
|---|---|---|---|
| 2010/0180216 A1 * | 7/2010 | Bates ...................... | A63F 13/75 |
| | | | 709/224 |
| 2015/0005071 A1 * | 1/2015 | Yockey .................. | G06N 3/006 |
| | | | 463/31 |
| 2018/0234447 A1 * | 8/2018 | Mueen ................ | G06F 16/2255 |
| 2018/0343221 A1 | 11/2018 | Alkov et al. | |
| 2018/0361250 A1 * | 12/2018 | Brew ...................... | A63F 13/75 |
| 2020/0068035 A1 * | 2/2020 | Wang .................. | H04L 63/1483 |
| 2020/0384363 A1 * | 12/2020 | Kyogoku .............. | A63F 13/525 |
| 2021/0026984 A1 | 1/2021 | Dotan-Cohen et al. | |
| 2023/0014321 A1 * | 1/2023 | Nair ...................... | A63F 13/79 |
| 2023/0216901 A1 * | 7/2023 | Chand .................. | H04M 1/724 |
| | | | 345/426 |
| 2024/0232307 A1 * | 7/2024 | Rai ......................... | G06F 21/32 |

OTHER PUBLICATIONS

Chetan, C. N., Ashit, D. H., Joseph, S. "An Approach to Solve the Identification and Authentication Challenges in Metaverse". IEEE. 2023 Somaiya International Conference on Technology and Information Management (SICTIM). Mar. 24-25, 2023. (Year: 2023).*
Mell et al., "The NIST Definition of Cloud Computing", NIST, Special Publication 800-145, Sep. 2011, 7 pages.

(Continued)

*Primary Examiner* — Dave Czekaj
(74) *Attorney, Agent, or Firm* — Erik Swanson; Andrew D. Wright; Calderon Safran & Wright P.C.

(57) ABSTRACT

Aspects of the present disclosure include: detecting, by a computing device, an avatar is chatting within a virtual environment; detecting, by the computing device, the avatar is idle for a predetermined amount of time; providing, by the computer device, a challenge to the idled avatar, determining, by the computer device, that the challenge has not been executed; and executing, by the computer device, a security action associated with the idled avatar.

20 Claims, 6 Drawing Sheets

(56) References Cited

OTHER PUBLICATIONS

Unknown, "Metaverse Bot detection system based on correlation of chats", Technology Vitality Report, ip.com, generated Oct. 27, 2022, 9 pages.

Salim, "Dubai Metaverse Assembly announced for September; to showcase 'real' meetings in virtual world", Khaleej Times, Jul. 19, 2022, 3 pages.

Shepherd, "20 Essential Meta Statistics You Need to Know in 2023", Social Shepherd Blog, Updated Feb. 23, 2023, 16 pages.

* cited by examiner

400

410

405

405

405a          ......          405n

BOT DETECTION SYSTEM

BACKGROUND

Aspects of the present invention relate generally to a bot detection system and, more particularly, to a system, method, and computer program product for detecting bots in a metaverse based on a correlation of chats and user activity.

A "bot" is an automated programmable entity, e.g., software application, that runs automated tasks over the Internet and particularly in social media, the metaverse or other virtual environments. These automated tasks are scripted tasks that are typically simple and structurally repetitive. These automated tasks are known to, for example, utilize significant resources of the metaverse, disrupt user's experiences and may even be used for fraudulent activities leading to security issues.

By way of some illustrative examples, bots may be used to market specific products or services, which are disruptive to the user experience. The bots may also increase traffic counts on analytics reporting which, in turn, may inflate the audience count thereby causing advertisers to lose revenue. The bots may also be used for malicious activities to deceive users into following them or be used to commit acts of fraud, e.g., influencing users to purchase certain products/services by providing misleading or false representations or causing the user to provide personal information of the user, amongst many other scenarios.

In any of these scenarios, bots are very resource intensive. That is, the bots utilize an excessive amount of bandwidth/processing power of servers that may be utilized for other purposes. For example, bots may slow down refresh rates or create bottlenecks. The utilization of these additional resources for bots may significantly increase costs for the service provider by requiring, e.g., additional servers to render the bots visually and audibly.

SUMMARY

In a first aspect of the invention, there is a computer-implemented method including: detecting, by a computing device, an avatar is chatting within a virtual environment; detecting, by the computing device, the avatar is idle for a predetermined amount of time; providing, by the computer device, a challenge to the idled avatar; determining, by the computer device, that the challenge has not been executed; and executing, by the computer device, a security action associated with the idled avatar.

In another aspect of the invention, there is a computer program product including one or more computer readable storage media having program instructions collectively stored on the one or more computer readable storage media. The program instructions are executable to: detect an avatar is not performing a spatial activity; detect the avatar is communicating; send a challenge to the avatar that is not performing the spatial activity and is communicating; detect that the challenge has not been executed by the avatar; and execute a security action against the avatar.

In another aspect of the invention, there is system including a processor, a computer readable memory, one or more computer readable storage media, and program instructions collectively stored on the one or more computer readable storage media. The program instructions are executable to: detect an avatar is chatting within a virtual environment; detect the avatar is idle for a predetermined amount of time; provide a challenge to the idled avatar; determine that the challenge has not been executed; and execute a security action associated with the idled avatar.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
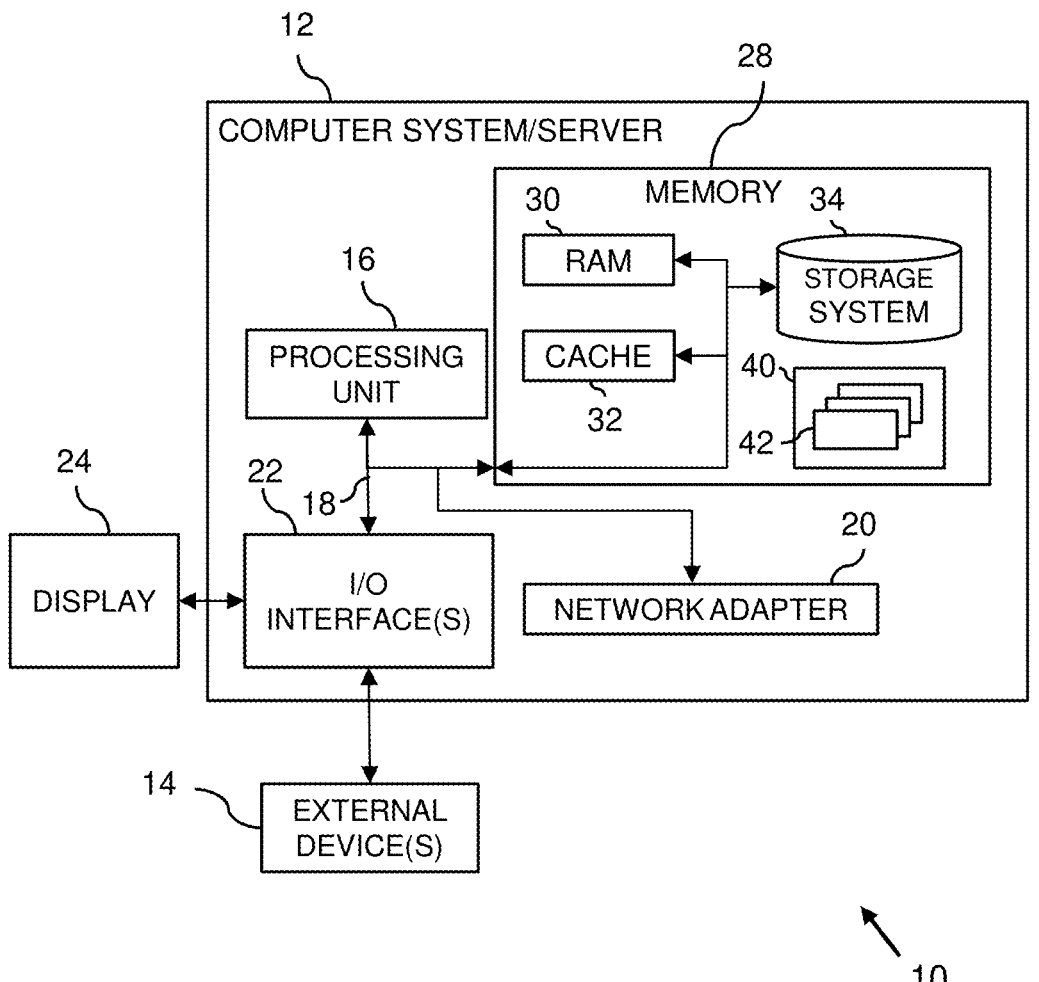
FIG. 1 depicts a cloud computing node according to an embodiment of the present invention.

Aspects of the present invention relate generally to a bot detection system and, more particularly, to a system, method, and computer program product for detecting bots in a metaverse based on a correlation of chats and user activity. In embodiments, bots may be defined as automated programmable entities that execute scripted actions and which utilize computing resources in a metaverse or other virtual environment. The metaverse may be any virtual environment in which users interact through avatars via client devices in a networked computing environment using, e.g., server devices. For example, the metaverse may be a single, shared, immersive, persistent, 3D virtual space where users interact with the environment and one another, similar to and/or different from that in the physical world.

In embodiments, the system, method, and computer program product detect bots by correlating spatial activity of an avatar (which may be representative of a bot) against chat interactions within the virtual environment, e.g., metaverse. More specifically, in embodiments, the invention detects potential bots by correlating the user activity on chats (e.g., text boxes used in a virtual environment which are representative of a communication between avatars), verbal dialogue or utterances, or other channels of communication against the bot's spatial activity, e.g., movements, within the virtual environment. Hereinafter, the term "metaverse" will be used as a generic representative term where users interact within any virtual environment or social network using a computing infrastructure such as shown and described with respect to FIG. 1.

In more specific embodiments, the system, method, and computer program product detect bots by correlating idle avatars against their communication activity and, as necessary, provide challenges to the idle avatar to confirm whether they are bots. For example, should the avatar be idle for a predetermined amount of time, a challenge will be presented to the avatar. As described in more detail herein, the challenge can be any requested activity to be executed by the avatar which would not be a potential scripted activity. As a bot is only capable of scripted actions, by not being able to execute the challenge, the system, method and computer program product would flag the avatar as a bot and take appropriate action. In embodiments, the appropriate action may one of several different security actions as described further herein. In this way, it is now possible to remove bots, in real-time, to thereby reduce computing resources, eliminate disruptive activity for other avatars that represent actual human users and, for example, to eliminate malicious threats.

Accordingly, in embodiments, the system, method, and computer program product provide a technical feature (e.g., technical solution) to a technical problem of detecting bot activity in the metaverse. In embodiments, the system, method, and computer program product, for example, provides a practical and significant application in detecting bot activity in the metaverse and removing the bot from the metaverse. For example, the system, method, and computer program product significantly reduces time to detect and remove bot activity in the metaverse. In fact, in embodiments, detection of the bot activity is provided in real-time, which leads to added security within the metaverse, increased positive user experiences, reduction in fraudulent activity and a reduction in server utilization. In addition, the system, method, and computer program product provide greater sensitivity to bot detection, amongst other examples.

It should be understood that, to the extent implementations of the invention collect, store, or employ personal information provided by, or obtained from, individuals (for example, users of avatars) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
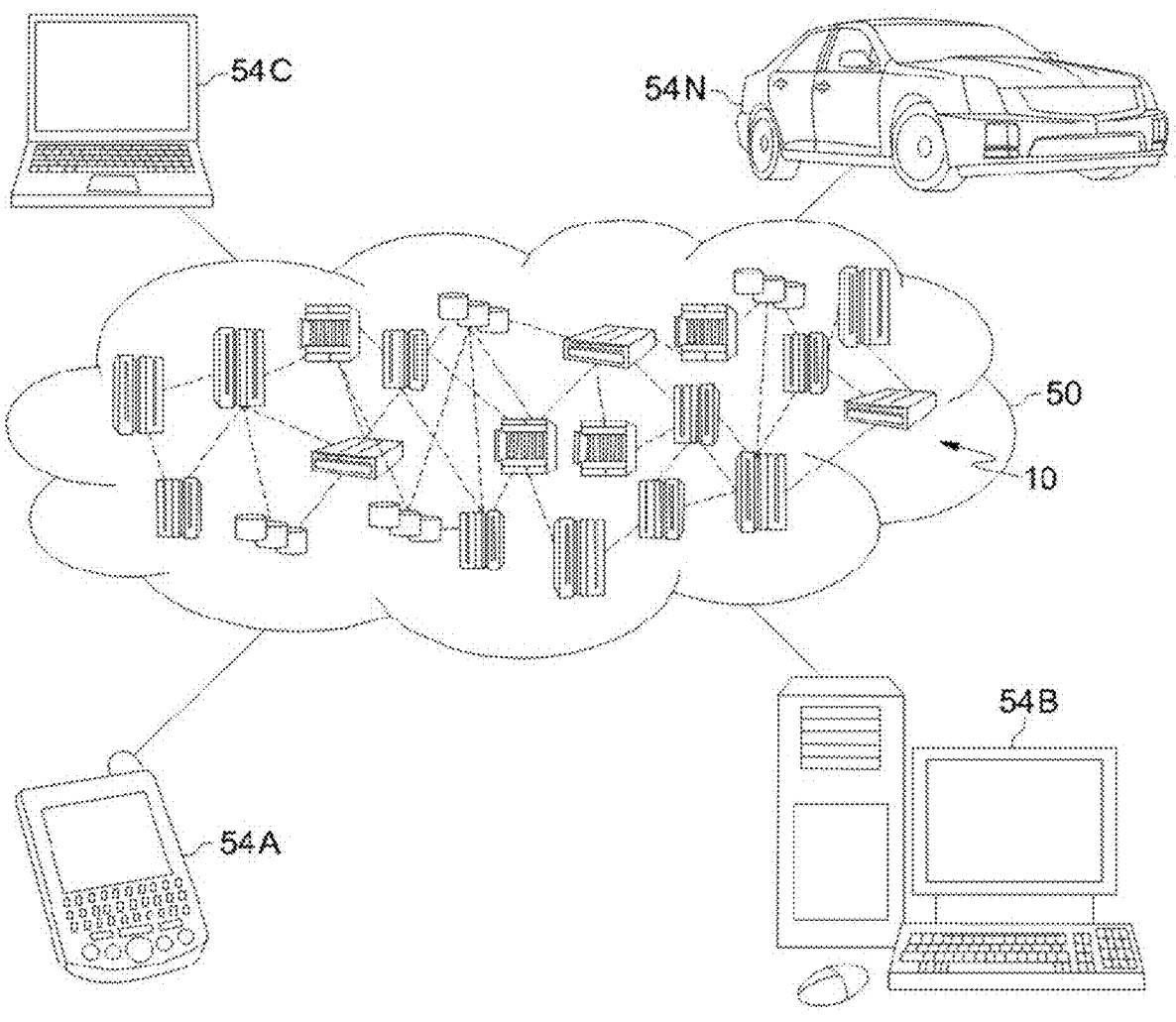
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
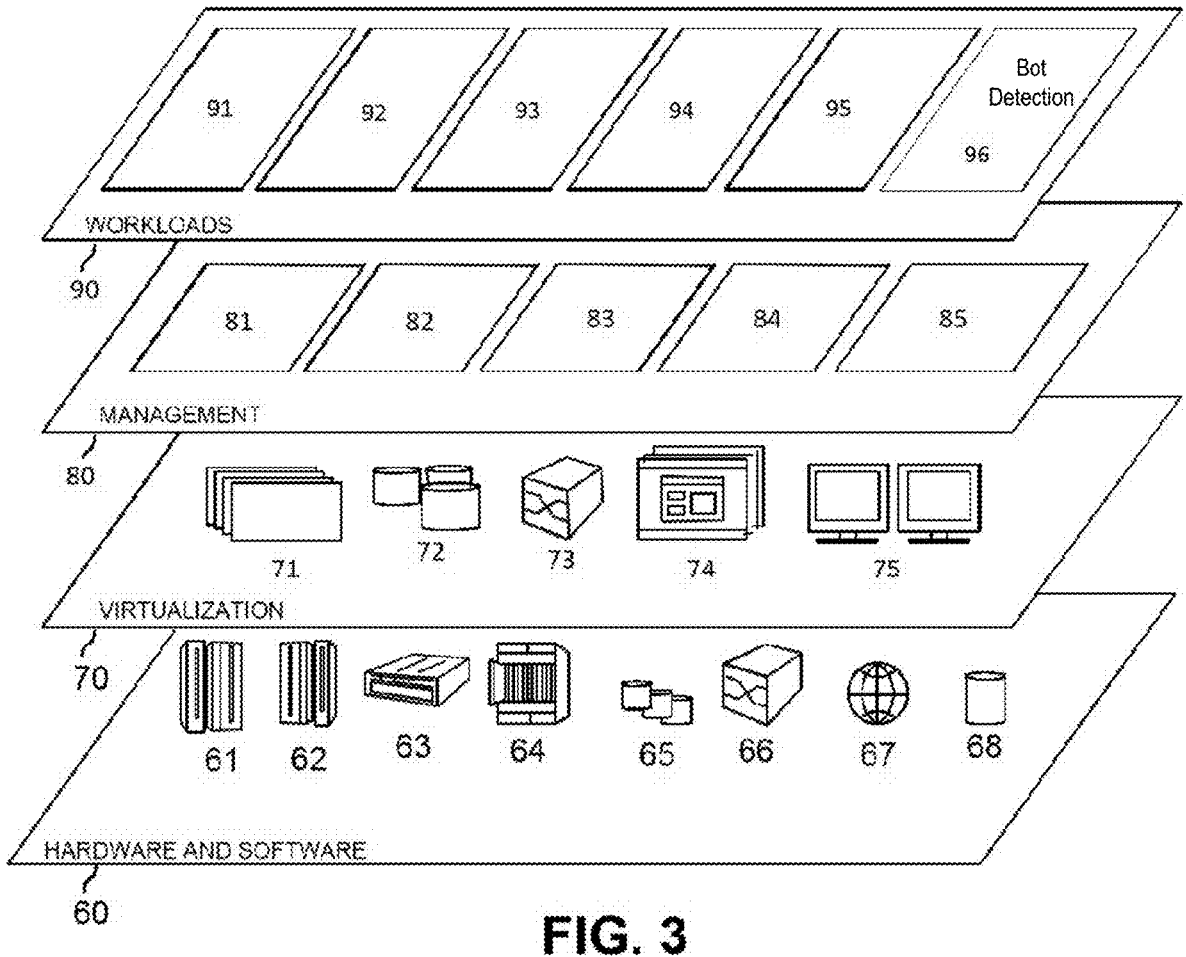
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and bot detection 96.

Implementations of the invention may include a computer system/server 12 of FIG. 1 in which one or more of the program modules 42 are configured to perform (or cause the computer system/server 12 to perform) one of more functions of the client sourced data restore 96 of FIG. 3. For example, the one or more of the program modules 42 of the client sourced data restore 96 may be configured to determine a relevance of objects by performing an assessment of references of an object across a plurality of clients; create a distributed cache of objects across a plurality of clients based on the reference assessment; update the distributed cache of objects based on a plurality of factors including available storage on the clients, reference assessments, availability of network resources, and availability of computing resources; analyze every restore request to determine if required data is contained on the distributed cache of objects; and perform a restore by prioritizing local resources on the distributed cache of objects.

Figure 4:
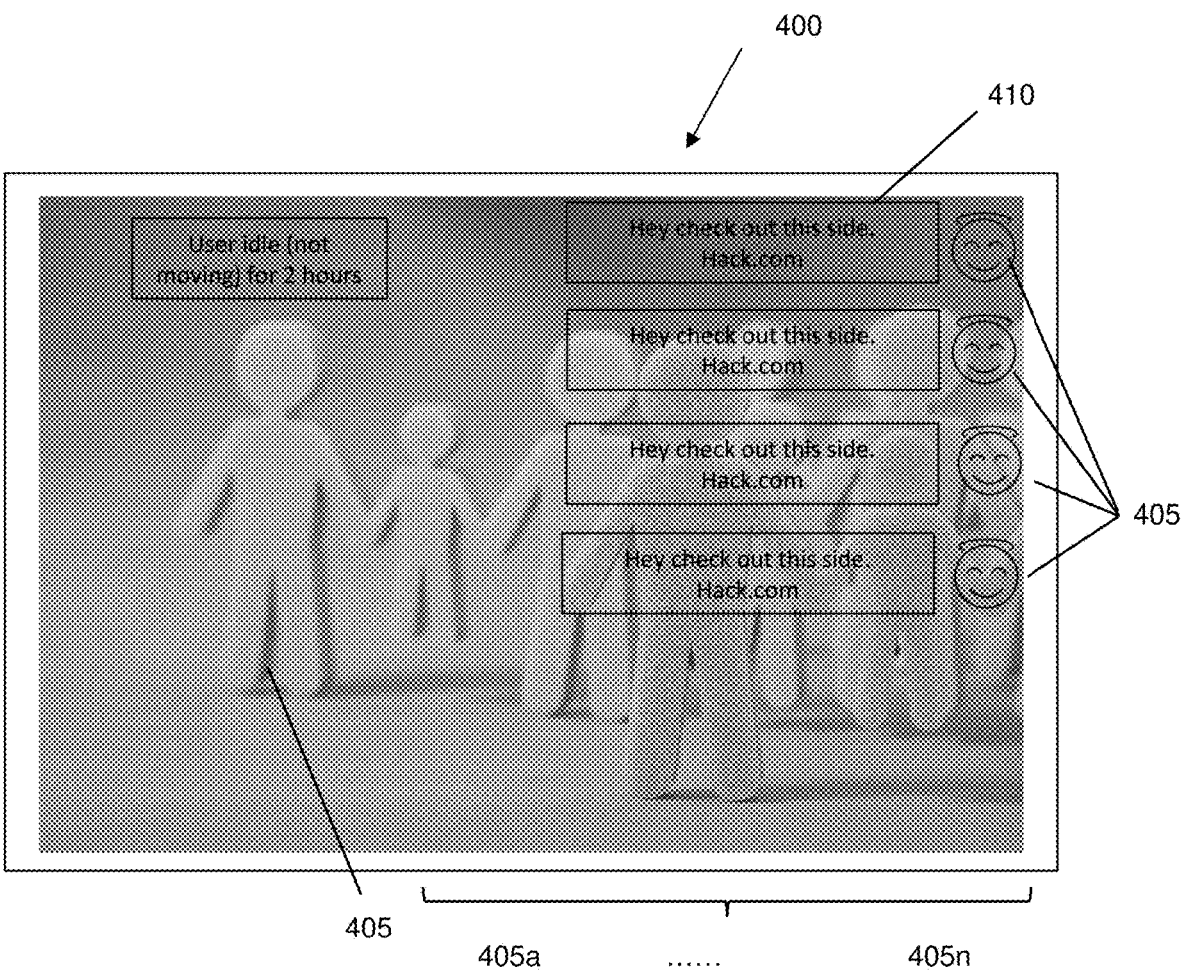
FIG. 4 shows a diagram of an exemplary environment in accordance with aspects of the invention.

FIG. 4 shows an exemplary environment in accordance with aspects of the invention. In embodiments, the environment 400 is representative of a virtual world within the metaverse. The metaverse 400 may be executed within the cloud computing environment 50, with each user (avatar) interacting within the metaverse using a computer system 12 shown in FIG. 1. The computing infrastructure of FIG. 1 may also be used to render the metaverse and any of the virtual worlds.

As shown in FIG. 4, at least one avatar 405, 405a . . . 405n (where n is an integer greater than 1) is within the virtual world. It should be recognized, though, that more than one avatar 405 may be simultaneously present in the virtual world within the metaverse, each of which are capable of interacting with other avatars (which may enter and exit the metaverse or particular "worlds" within the metaverse) and their environment. The communication between the avatars 405 may be conducted through chat boxes 410 or other communication channels, e.g., verbal renderings using, for example, a voice generator, as is known in the art. The conversation may be provided within a public or private chat, e.g., public or private virtual world. In this example, the avatar 405 is represented as a virtual person; although the avatar 405 can take on other forms such as animals, anime, etc. depending on the theme of the virtual world. In any themed scenario, avatars 405 represent actual users, e.g., people, are capable of movement, e.g., spatial activity, within the virtual world. The avatars 405 may also represent bots which, on the other hand, are not capable of movement within the virtual world.

In the example scenario of FIG. 4, the avatar 405 is conducting a conversation within the virtual world that is repetitive in nature as depicted by the chat boxes 410. For example, the text within the chat boxes 410 is a scripted text that is structurally repetitive as evidenced by a series of the same utterances, i.e., "Hey check out this site: hack.com". In addition, the avatar 405 has been idle (not moving) for a predetermined amount of time, e.g., 2 hrs.

Based on these circumstances, a user, administrator of the metaverse or the metaverse, itself, may flag the avatar 405 as a bot. In this situation, the metaverse will automatically invoke a challenge to the avatar 405, which requires some action to be executed by the avatar 405 to ensure that the avatar 405 is, indeed, a bot. The challenge may be any action that is not part of the scripted activity of a bot. Illustratively and as non-limiting examples, the challenge may comprise:

(i) execute a certain movement, e.g., move forward, backward, left, right, turn around 180 degrees, kneel, jump, wave hands, etc.; (ii) solve a math problem, e.g., what is 1+1, etc.; (iii) answer a simple question, e.g., what is the shape of a ball?, what is the color of the balloon shown?, etc. or (iv) present the avatar with certain objects and ask them to identify one of the objects, e.g., which balloon is red. The challenge may be provided directly to the avatar 405, without rendering the challenge shown to other avatars within the virtual world of the metaverse.

Should the avatar 405 not be able to execute the challenge, the metaverse will automatically execute a security action. The security action may include, for example, (i) complete or partial banishment from the metaverse, (ii) automatic logging out of the avatar from the metaverse or the particular virtual world, (iii) request the user of the avatar to double factor authenticate themselves to verify that the avatar is not a bot or that the user's identification has not been stolen, and/or (iv) request the avatar to relog into the metaverse, amongst other actions. Should the avatar not be able to double factor authenticate themselves and it is determined that the avatar belongs to another user, the metaverse may provide a notice to the user that their avatar has been stolen.

Figure 5:
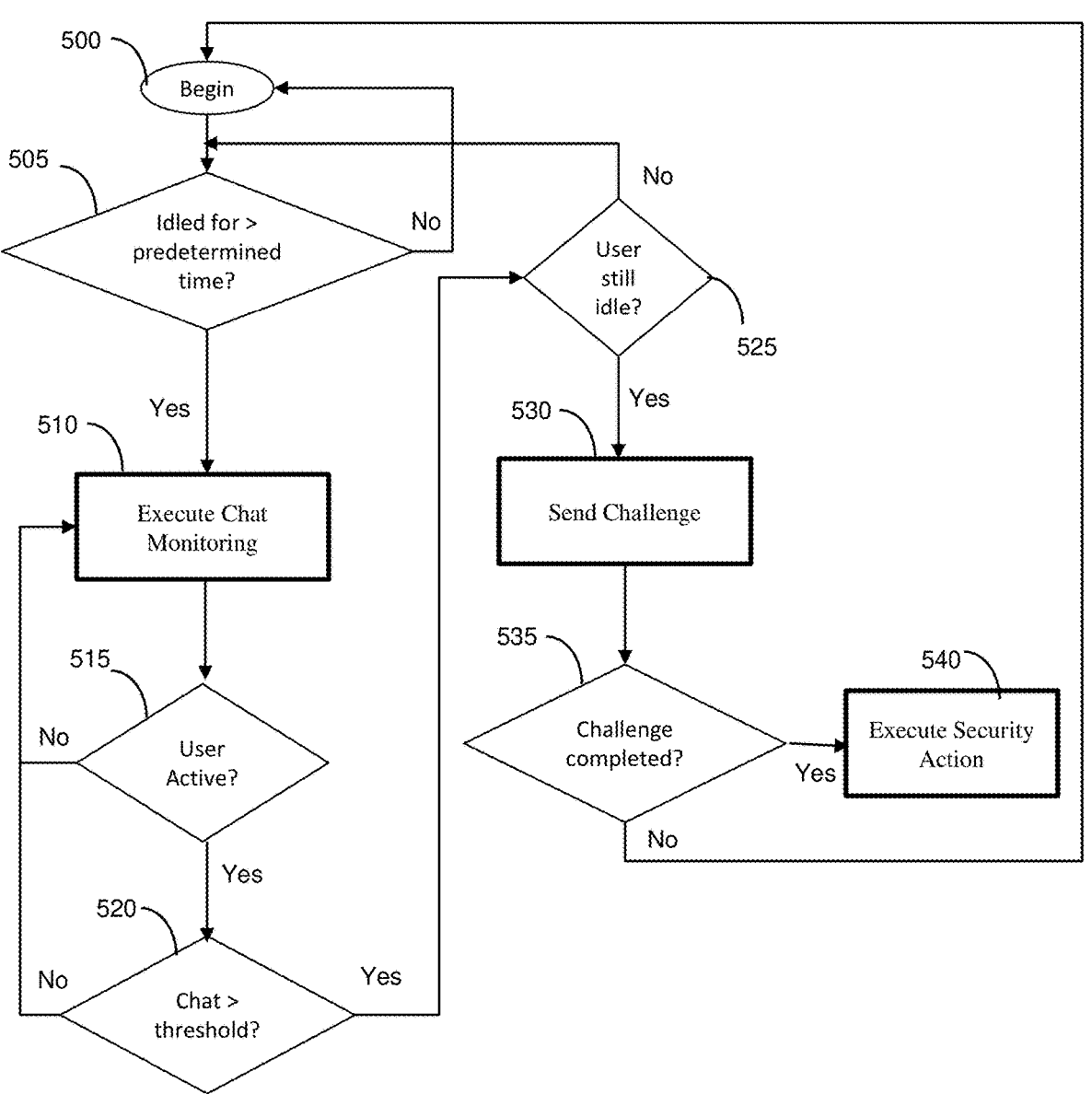
FIG. 5 shows a flowchart of an exemplary method in accordance with aspects of the present invention.

FIG. 5 shows a flowchart of an exemplary method in accordance with aspects of the present invention. Steps of the method may be carried out in the environment of FIG. 4 and within the infrastructure of FIGS. 1-3, for example.

At step 505, the system determines whether the user (e.g., avatar) has been idled for more than a predetermined time period. In embodiments, idle refers to a lack of spatial activity (e.g., movement) of the avatar within the virtual environment. The predetermined time period may be different depending on different scenarios such as the user being in a certain virtual world of the metaverse, e.g., rallies, business meeting, entertainment venues, etc. By way of illustrative and non-limiting example, the predetermined time period may be two (2) hours for an entertainment venue or rally and one (1) hour for a private chat in a business meeting. If the idle time is less than the predetermined time period, the processes will revert back to the start at step 500.

If the idle time is greater than the predetermined time period, the system will execute a chat monitoring process at step 510. In embodiments, the chat monitoring process may be executed by a chat monitoring engine, e.g., a dedicated processor (e.g., processing unit 116 of FIG. 1) that monitors the chats (or other communication) of avatars. This chat monitoring process may comprise monitoring any type of communication, e.g., any utterances, texting, writing, etc., of the avatars. The system then proceeds to step 515, where a determination is made as to whether the avatar is active on chat or other communication mechanism, e.g., is speaking. If the avatar is not active, the system will revert back to step 510. If the avatar is active, the system will continue to step 520.

At step 520, a determination is made as to whether the chat is above a certain threshold. The threshold may be based on time or quantity of chats (or other communication). For example, the threshold may be a predetermined time period, e.g., 10 minutes, or quantity of communication, e.g., 20 or more chat messages. If the chat time or quantity does not meet the threshold at step 520, the system reverts to step 510. If the chat time or quantity does meet the threshold at step 520, the system proceeds to step 525.

At step 525, a determination is made as to whether the avatar is still idle. This step is provided to avoid false positive results by providing a second check on the idleness of the avatar. If the avatar is not idle, the system reverts to step 505. If the avatar is still idle, the system proceeds to step 530. At step 530, a challenge is sent to the avatar. As noted herein, the challenge can be any challenge in which a bot would not be able to execute, e.g., a certain movement, an answer to a certain question, a selection of a certain item, etc.

At step 535, a determination is made as to whether the avatar has completed the challenge. If the challenge has been completed, the system reverts back to step 500. If it is determined that the avatar has not completed the challenge, the system will then execute a security action at step 540. This security action may include, amongst other actions: (i) request a multifactor authentication (which may be used to determine that an account may have been hacked or stolen); (ii) automatically log out the user for a predetermined period of time, e.g., 1 day, 1 week, etc.; (iii) request the user to log back into the metaverse with or without double factor authentication; (iv) provide a warning to the user that their avatar will be deactivated in a certain time period if no spatial activity is detected; and/or (v) delete the avatar from the metaverse, etc.

Figure 6:
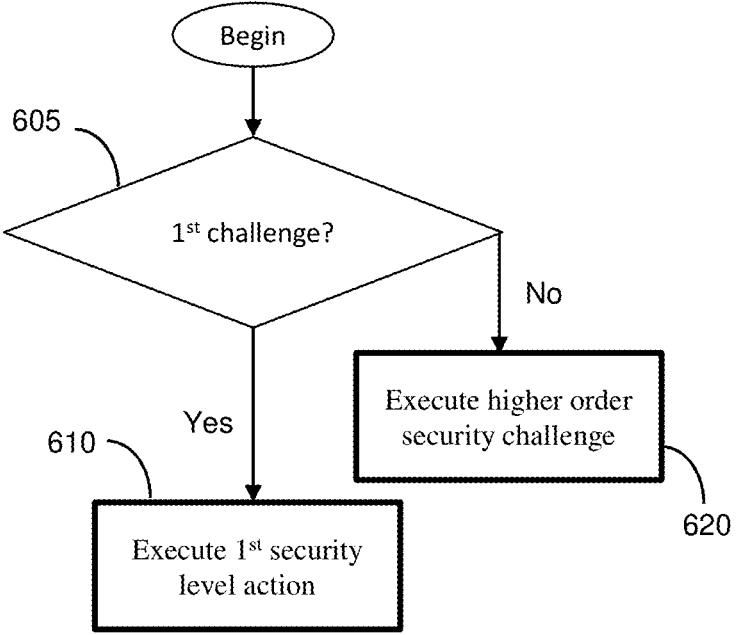
FIG. 6 shows a flowchart of an exemplary method in accordance with additional aspects of the present invention.

FIG. 6 shows a flowchart of an exemplary method in accordance with additional aspects of the present invention. In embodiments, the flowchart provides an escalation process which is used to escalate the security action provided at step 540 in FIG. 5. For example, at step 600, a determination is made as to whether this is a first challenge which was not executed by the avatar. If it is a first challenge that is not executed, the system will provide a first level security action at step 605, e.g., avatar will be locked out of the account for a maximum of one day. If the determination is made this is not a first challenge, it is assumed that the bot has been flagged for a second or more time, at which point a second or higher level security action will be executed at step 610, e.g., lock out of the account for 30 days. It should be understood by those of skill in the art that the processes of FIG. 6 may be further refined in that the processes can be used to determine if the challenge was not executed for a particular avatar a second or greater time, in which case the system can escalate the security actions to different levels, e.g., permanent lock of the account.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
detecting, by a computing device, an avatar is chatting within a virtual environment;
detecting, by the computing device, the avatar is idle for a predetermined amount of time;
providing, by the computing device, a challenge invoked in the virtual environment directly to the idled avatar during a first time period following the predetermined amount of time;
determining, by the computing device, that the challenge has not been executed;
executing, by the computing device, a first security action associated with idled avatar in the virtual environment;
determining, by the computing device, whether the idled avatar has been challenged before the first time period; and
executing, by the computing device, a second security action associated with the idled avatar in the virtual environment, in response to the idled avatar having been challenged before the first time period, the second security action being different from the first security action.

2. The method of claim 1, wherein the idled avatar comprises a lack of spatial activity of the avatar for the predetermined amount of time within the virtual environment.

3. The method of claim 1, wherein the virtual environment comprises a metaverse.

4. The method of claim 1, further comprising flagging the avatar as being a bot based on the challenge not being executed.

5. The method of claim 1, wherein the chat is a repetitive dialogue.

6. The method of claim 5, wherein the repetitive dialogue comprises one of a chat box associated with the avatar and an utterance of the avatar.

7. The method of claim 1, wherein the challenge is a non-scripted challenge that cannot be performed by a bot.

8. The method of claim 1, wherein the first security action comprises: (i) complete or partial banishment of the idled avatar from the virtual environment, (ii) logging off the idled avatar from the virtual environment, (iii) requesting a double factor authentication from the idled avatar, (iv) requesting the idled avatar to relog in to the virtual environment, or (v) any combination thereof.

9. The method of claim 1, wherein the second security action comprises permanently locking an account of the idled avatar in the virtual environment.

10. The method of claim 1, further comprising determining, by the computer device, that the chat is above a certain threshold based on a quantity of chats.

11. The method of claim 10, wherein the certain threshold is a predetermined amount of utterances.

12. A computer program product comprising one or more computer readable storage media having program instructions collectively stored on the one or more computer readable storage media, the program instructions executable to:
detect an avatar is not performing a spatial activity within a virtual environment;
detect the avatar is communicating;
send a challenge invoked in the virtual environment directly to the avatar that is not performing the spatial activity and is communicating during a first time period following the predetermined amount of time;
detect that the challenge has not been executed by the avatar;
execute a first security action against the avatar in the virtual environment;
determine whether the avatar has been challenged before the first time period; and
execute a second security action against the avatar in the virtual environment, in response to the avatar having been challenged before the first time period, the second security action being different from the first security action.

13. The computer program product of claim 12, wherein the spatial activity comprises movement in the virtual environment.

14. The computer program product of claim 12, wherein the avatar is a bot.

15. The computer program product of claim 14, wherein the challenge comprises an action that cannot be executed by the bot.

16. The computer program product of claim 13, wherein the challenge is a requested movement of the avatar.

17. The computer program product of claim 12, wherein the first security action comprises: (i) complete or partial banishment of the idled avatar from the virtual environment, (ii) logging off the avatar from the virtual environment, (iii) requesting a double factor authentication from the idled avatar, (iv) requesting the idled avatar to relog in to the virtual environment, or (v) any combination thereof.

18. The computer program product of claim 12, further comprising detecting that the chatting is above a threshold and there remains no spatial activity of the avatar, prior to sending the challenge to the avatar.

19. The computer program product of claim 12, wherein the communicating comprises a chat box within the virtual environment.

20. A system comprising:
a processor, a computer readable memory, one or more computer readable storage media, and program instructions collectively stored on the one or more computer readable storage media, the program instructions executable to:
detect an avatar is chatting within a virtual environment;
detect the avatar is idle for a predetermined amount of time;
provide a challenge invoked in the virtual environment directly to the idled avatar during a first time period following the predetermined amount of time;
determine that the challenge has not been executed;
execute a first security action associated with the idled avatar in the virtual environment;
determine whether the idled avatar has been challenged before the first time period; and
execute a second security action associated with the idled avatar in the virtual environment, in response to the idled avatar having been challenged before the first time period, the second security action being different from the first security action.

\* \* \* \* \*